US012577821B2

(12) United States Patent
Eickhoff et al.

(10) Patent No.: US 12,577,821 B2
(45) Date of Patent: Mar. 17, 2026

(54) DOOR OPERATOR ARMATURE CONNECTIONS

(71) Applicant: Schlage Lock Company LLC, Carmel, IN (US)

(72) Inventors: Brian C. Eickhoff, Danville, IN (US); Nagesh Varadaraju, Bangalore (IN); David V. Toloday, Martinsville, IN (US); Subashchandra G. Rai, Bangalore (IN); Chad Eagin, Carmel, IN (US); Benaka Gireesha, Udupi (IN)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 18/380,241

(22) Filed: Oct. 16, 2023

(65) Prior Publication Data

US 2024/0229532 A1      Jul. 11, 2024

Related U.S. Application Data

(62) Division of application No. 16/665,414, filed on Oct. 28, 2019, now abandoned.

(51) Int. Cl.
| | |
|---|---|
| *E05F 1/00* | (2006.01) |
| *F16B 7/04* | (2006.01) |
| *F16L 33/02* | (2006.01) |

(52) U.S. Cl.
CPC ................. *E05F 1/00* (2013.01); *F16B 7/04* (2013.01); *E05Y 2900/132* (2013.01)

(58) Field of Classification Search
CPC ... F16B 2/08; F16L 33/02; F16L 33/14; F16L 33/025; F16L 33/035; E05F 1/00; E05Y 2201/624
(Continued)

(56) References Cited

U.S. PATENT DOCUMENTS

| | | |
|---|---|---|
| 693,595 A | 2/1902 | Frazier |
| 914,133 A | 3/1909 | Fulton |

(Continued)

FOREIGN PATENT DOCUMENTS

| | | |
|---|---|---|
| DE | 2245748 A1 | 4/1974 |
| FR | 2378163 A | 1/1977 |

(Continued)

*Primary Examiner* — Emily M Morgan
(74) *Attorney, Agent, or Firm* — Taft Stettinius & Hollister LLP

(57) ABSTRACT

An exemplary door control assembly includes a door control and an armature assembly. The door control includes a body and a pinion rotatably mounted to the body for rotation about a rotational axis. The pinion has a radially-outer periphery and a recess is formed in the radially-outer periphery. The armature assembly comprises an armature and a coupler. The armature is rotationally coupled with the pinion, and includes an opening in which the pinion is received. The coupler is movably mounted to the armature for movement between a coupling position and a decoupling position. With the coupler in the coupling position, the coupler projects into the recess and axially couples the armature and the pinion to prevent removal of the armature from the pinion. With the coupler in the decoupling position, the coupler axially decouples the armature and the pinion to permit removal of the armature from the pinion.

13 Claims, 9 Drawing Sheets

(58) Field of Classification Search
USPC ................................................ 16/71; 24/20 R
See application file for complete search history.

(56) References Cited

U.S. PATENT DOCUMENTS

| | | | |
|---|---|---|---|
| 1,028,460 A | | 6/1912 | Henry |
| 1,047,691 A | | 12/1912 | Olsen et al. |
| 2,110,889 A | | 3/1938 | Mitchell |
| 2,448,278 A | | 8/1948 | Martin |
| 2,455,760 A | * | 12/1948 | Gustafson ............. F16L 33/221 |
| | | | 24/20 R |
| 2,782,453 A | | 2/1957 | Schlage |
| 4,160,304 A | | 7/1979 | Smith et al. |
| 4,185,935 A | | 1/1980 | Bierlein |
| 4,380,096 A | * | 4/1983 | Nishida ................... F16L 33/03 |
| | | | 24/20 R |
| 4,645,368 A | | 2/1987 | Simpson et al. |
| 4,743,079 A | * | 5/1988 | Bloch ...................... H01R 4/01 |
| | | | 285/308 |
| 5,193,419 A | | 3/1993 | Lee |
| 5,261,145 A | * | 11/1993 | Jennings ............... F16L 33/035 |
| | | | 24/20 R |
| 5,472,254 A | | 12/1995 | Wander |
| 5,497,533 A | | 3/1996 | Karlsen |
| 8,336,834 B2 | * | 12/2012 | Matsumoto ............. F16L 33/03 |
| | | | 248/62 |
| 8,415,902 B2 | | 4/2013 | Burris et al. |
| 8,746,703 B2 | | 6/2014 | Xu et al. |
| 11,112,046 B2 | | 9/2021 | Caudell |
| 11,644,133 B2 | * | 5/2023 | Rabasa ................... F16L 23/10 |
| | | | 285/365 |
| 2003/0159255 A1 | * | 8/2003 | Senovich ............... F16L 33/03 |
| | | | 24/20 R |
| 2004/0207195 A1 | * | 10/2004 | Bowater ................. F16L 33/08 |
| | | | 285/23 |
| 2008/0098575 A1 | * | 5/2008 | Krauss ................... F16L 33/08 |
| | | | 24/20 R |
| 2009/0265992 A1 | | 10/2009 | Hass et al. |
| 2011/0296668 A1 | | 12/2011 | Emmerich |
| 2015/0211278 A1 | * | 7/2015 | Moyer ................... E05F 3/102 |
| | | | 16/52 |
| 2016/0369545 A1 | * | 12/2016 | Bell ....................... E05F 15/63 |
| 2017/0130500 A1 | * | 5/2017 | Bell ....................... E05F 3/227 |
| 2019/0186514 A1 | * | 6/2019 | You ........................... F16B 2/08 |
| 2020/0173587 A1 | * | 6/2020 | Breideband ............. F16L 33/08 |
| 2020/0191188 A1 | | 6/2020 | Carper et al. |
| 2022/0196192 A1 | * | 6/2022 | Rabasa ................... F16L 23/08 |

FOREIGN PATENT DOCUMENTS

| | | | |
|---|---|---|---|
| IN | 210461328 U | 5/2020 | |
| KR | 101911507 B1 | 10/2018 | |

* cited by examiner

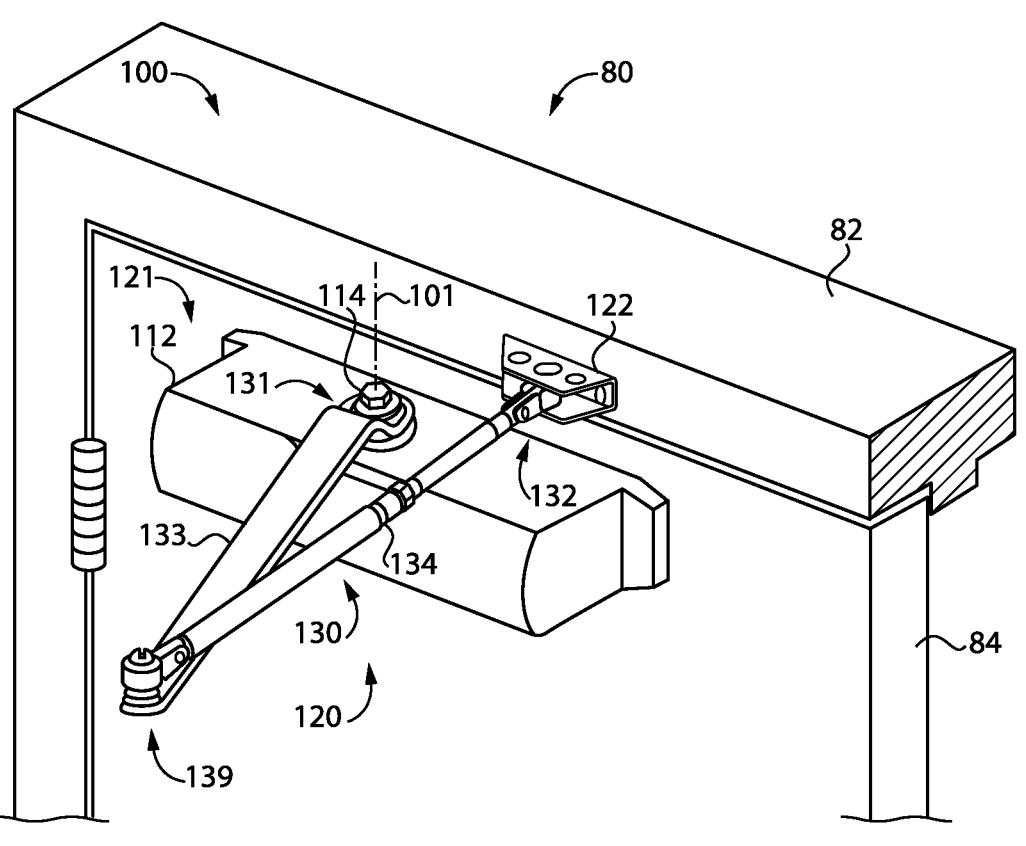
FIG. 1
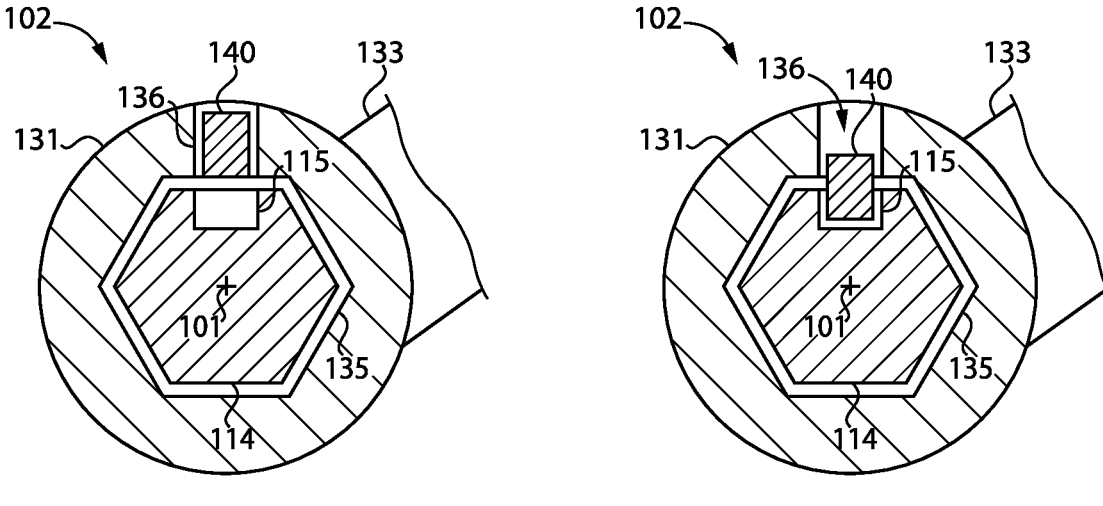
FIG. 2                          FIG. 3

DOOR OPERATOR ARMATURE CONNECTIONS

CROSS-REFERENCE TO RELATED APPLICATIONS

The present application is a divisional of U.S. patent application Ser. No. 16/665,414 filed Oct. 28, 2019, the contents of which are incorporated herein by reference in their entirety.

TECHNICAL FIELD

The present disclosure generally relates to door operators, and more particularly but not exclusively relates to systems and methods for attaching armatures to door operators.

BACKGROUND

Door operators (e.g., door closers and door openers) typically include a body, a pinion rotatably mounted to the body, an armature rotationally coupled with the pinion, and one or more mechanisms that bias the pinion and armature in a door-closing direction and/or selectively drive the pinion and armature in a selected direction. In many conventional door operators, the pinion is provided with a hexagonal head that is received in a hexagonally-shaped opening formed in the armature. A screw extending along the rotational axis of the pinion is used to axially secure the pinion and the armature. However, it has been found that this conventional method of securing a pinion to an armature can suffer from certain drawbacks, such as those related to ease of installation. For these reasons among others, there remains a need for further improvements in this technological field.

SUMMARY

An exemplary door control assembly includes a door control and an armature assembly. The door control includes a body and a pinion rotatably mounted to the body for rotation about a rotational axis. The pinion has a radially-outer periphery and a recess is formed in the radially-outer periphery. The armature assembly comprises an armature and a coupler. The armature is rotationally coupled with the pinion, and includes an opening in which the pinion is received. The coupler is movably mounted to the armature for movement between a coupling position and a decoupling position. With the coupler in the coupling position, the coupler projects into the recess and axially couples the armature and the pinion to prevent removal of the armature from the pinion. With the coupler in the decoupling position, the coupler axially decouples the armature and the pinion to permit removal of the armature from the pinion. Further embodiments, forms, features, and aspects of the present application shall become apparent from the description and figures provided herewith.

BRIEF DESCRIPTION OF THE FIGURES

FIG. 1 is a perspective illustration of a closure assembly including a door operator assembly according to certain embodiments.

FIG. 2 is a cross-sectional view of a portion of the door operator assembly illustrated in FIG. 1, with a coupling member in a decoupling position.

FIG. 3 is a cross-sectional view similar to that of FIG. 2, with the coupling member in a coupling position.

DETAILED DESCRIPTION OF ILLUSTRATIVE EMBODIMENTS

Figures 4, 5:
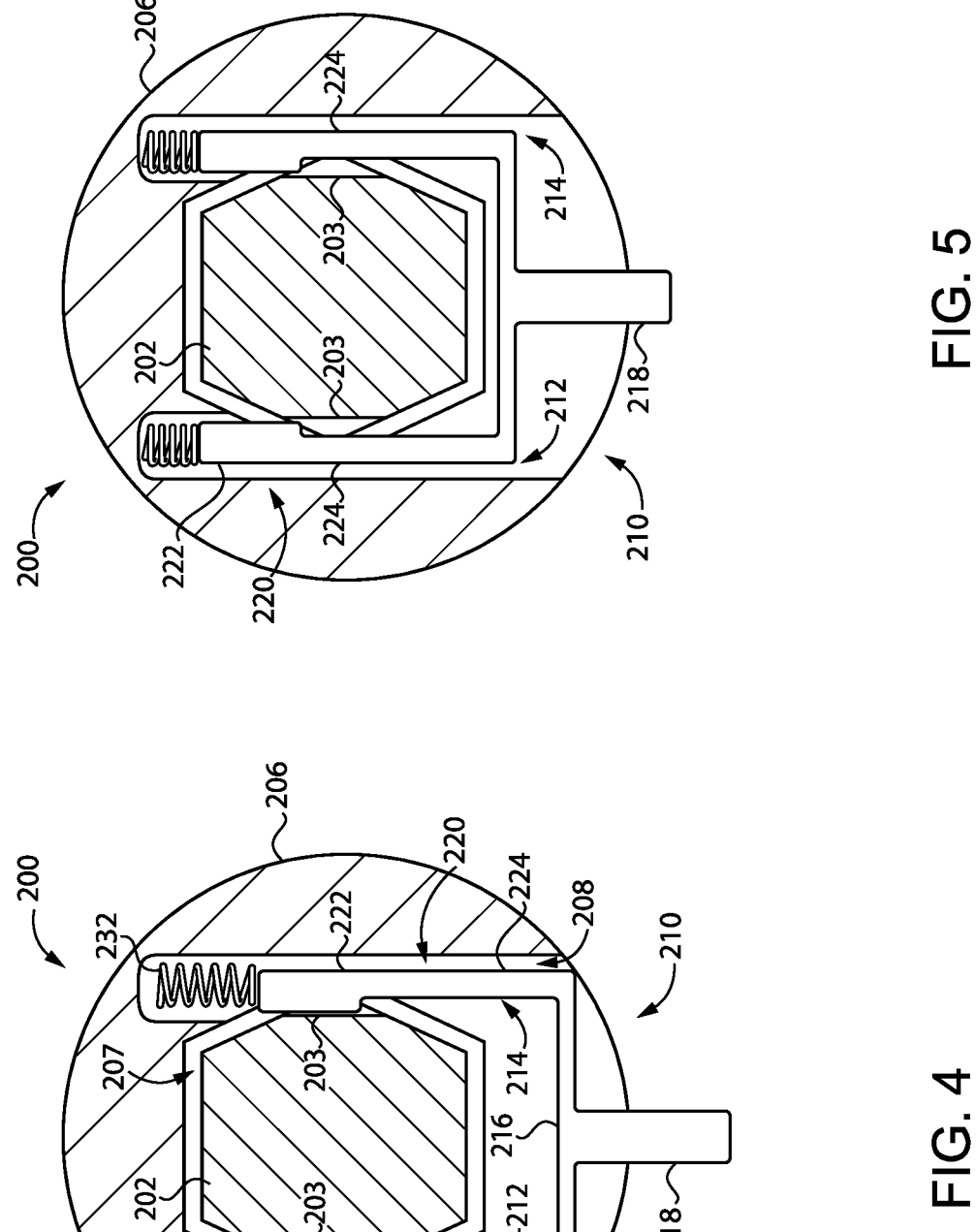
FIG. 4 is a cross-sectional view of a coupling mechanism according to certain embodiments in a coupling state.
FIG. 5 is a cross-sectional view of the coupling mechanism illustrated in FIG. 4 while in a decoupling state.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a closure assembly 80 according to certain embodiments. The closure assembly 80 generally includes a doorframe 82, a swinging door 84 pivotally mounted to the doorframe 82, and a door control assembly 100 connected between the doorframe 82 and the door 84. The door control assembly 100 generally includes a door control 110 mounted to the door 84 and an armature assembly 120 connected between the door control 110 and the doorframe 82. The door control 110 generally includes a body 112 and a pinion 114 rotatably mounted to the body 112 for rotation about a longitudinal rotational axis 101. The armature assembly 120 generally includes a shoe 122 mounted to the doorframe 82, an armature 130 having a first end portion 131 coupled with the pinion 114 and an opposite second end portion 132 pivotally coupled with the shoe 122.

With additional reference to FIGS. 2 and 3, the door control assembly 100 further includes an axial coupling mechanism 102 operable to selectively axially couple the armature assembly 120 with the pinion 114. More particularly, the pinion 114 includes at least one recess 115 defined in the radially-outer periphery thereof, and the axial coupling mechanism 102 comprises a coupler 140 that is movably coupled to the first end portion 131 and operable to engage the recess 115. The coupler 140 is movable between a decoupling position (FIG. 2) in which the coupler 140 is engaged with the recess 115, and a coupling position (FIG. 3) in which the coupler 140 is disengaged from the recess 115. As described herein, the axial coupling mechanism 102 permits axial separation of the pinion 114 and the armature 130 when the coupler 140 is in the decoupling position, and axially couples the pinion 114 and the armature 130 when the coupler 140 is in the coupling position. In certain embodiments, the coupling mechanism 102 may further be configured to selectively rotationally couple the pinion 114 and the armature first end portion 131.

The door 84 is movable relative to the doorframe 82 between an open position and a closed position, and the door control assembly 100 aids in the movement of the door 84 toward at least one of the open position or the closed position by exerting forces on the pinion 114. In certain embodiments, the door control 110 may be configured to urge the door from the open position toward the closed position by urging the pinion 114 in a door-closing direction. Additionally or alternatively, the door control 110 may be operable to selectively urge the door 84 from its closed position toward its open position by urging the pinion 114 in a door-opening direction. Those skilled in the art will readily appreciate that rotation of the pinion 114 in the door-opening direction and the door-closing direction are respectively correlated with opening and closing of the door 84. The door control 110 may, for example, include a hydraulic system, a mechanical system, and/or an electromechanical system that provides the door control 110 with the ability to exert the appropriate forces on the pinion 114. The door control 110 may be provided as any of several conventional types of door control (e.g., a door opener or door closer) that controls movement of a door by exerting forces on a rotatable pinion. The internal mechanisms that provide for the forces exerted on the pinion in door controls of this type are known in the art, and need not be described in further detail herein.

As noted above, the armature assembly 120 generally includes a shoe 122, an armature 130 connected between the pinion 114 and the shoe 122, and coupler 140 that selectively axially couples the pinion 114 with the armature 130. In the illustrated form, the door control 110 is mounted to the door 84, and the shoe 122 is mounted to the doorframe 82 such that the door control 110 is engaged with the doorframe 82 via the armature assembly 120. In other embodiments, however, the door control 110 is mounted to the doorframe 82 and the shoe 122 is mounted to the door 84 such that the door control 110 is engaged with the door 84 via the armature assembly 120.

The armature 130 includes a first end portion 131 coupled with the pinion 114 and an opposite second end portion 132 pivotably coupled with the shoe 122. In the illustrated form, the armature 130 includes a first arm 133 defining the first end portion 131, a second arm 134 defining the second end portion 132, and a pivot joint 139 pivotably coupling the first arm 133 and the second arm 134. While the illustrated armature 130 is provided in a standard configuration in which the arms 133, 134 extend away from the door 84 when the door 84 is in the closed position, it is also contemplated that the armature 130 may be provided in a "parallel arm" configuration, in which the arms 133, 134 extend substantially parallel to the door 84 when the door 84 is in the closed position.

In the illustrated form, the shoe 122 provides a fixed pivot point for the second end portion 132 of the armature 130, which includes first and second arms 133, 134 that are pivotably connected at a pivot joint 139. In other embodiments, the armature 130 may include a single rigid arm defining both the first end portion 131 and the second end portion 132. In such forms, the shoe 122 may provide a traveling pivot point for the second armature end 132. For example, the shoe 122 may include a slide track along which the second end portion 132 slides as the door 84 moves between its open and closed positions.

The first end portion 131 of the armature 130 defines an opening 135 sized and shaped to receive the pinion 114. In certain embodiments, the opening 135 is sized and shaped for rotational coupling with the pinion 114, and has an inner cross-section corresponding to the outer cross-section of the pinion 114. While these cross-sections are generally hexagonal in the illustrated form, it is also contemplated that other geometries may be utilized, including other generally polygonal geometries. The first end portion 131 further includes at least one cavity 136 connected with the opening 135 and aligned with the recess 115, and the coupler 140 is movably seated in the cavity 136. Certain exemplary forms of the coupling mechanism 102 will now be described with reference to FIGS. 4-22.

With additional reference to FIGS. 4 and 5, illustrated therein is a coupling mechanism 200 according to certain embodiments. The coupling mechanism 200 is an embodiment of the above-described coupling mechanism 102, and is illustrated along with a pinion 202 corresponding to the pinion 114 and an armature first end portion 206 corresponding to the first end portion 131 of the armature 130. The pinion 202 includes a pair of grooves 203 that correspond to the at least one recess 115. Additionally, the first end portion 206 includes an opening 207 corresponding to the opening 135 and a cavity 208 corresponding to the cavity 136.

The coupling mechanism 200 includes a coupler in the form of a horseshoe member 210 including a first leg 212, a second leg 214 generally parallel to the first leg 212, and a connecting portion 216 connecting the first leg 212 with the second leg 214. Each leg 212, 214 defines a corresponding and respective pin 220, each of which has an enlarged-diameter portion 222 and a reduced-diameter portion 224. The horseshoe member 210 may further include a projection 218 that facilitates manual manipulation of the coupling mechanism 200 to facilitate movement of the horseshoe member 210 between a coupling position (FIG. 4) and a decoupling position (FIG. 5). The horseshoe member 210 is biased toward the coupling position by a biasing mechanism 230, which in the illustrated form includes a pair of compression springs 232. In the illustrated embodiment, each of the springs 232 is engaged with a corresponding one of the pins 220. In other forms, the biasing mechanism 230 may include a single biasing member, such as a spring 232 engaged with the connecting portion 216. Additionally, while the illustrated biasing mechanism 230 includes biasing members in the form of compression springs 232, it is also contemplated that the biasing mechanism 230 may include other forms of biasing members, such as one or more extension springs, torsion springs, leaf springs, elastic members, and/or magnets.

FIG. 4 illustrates the coupling mechanism 200 in its coupling state, in which the horseshoe member 210 is in the coupling position to which it is biased by the biasing mechanism 230. In this state, each enlarged portion 222 is received in the corresponding groove 203 such that the pinion 202 is axially coupled with the armature first end portion 206. As a result, relative axial movement of the pinion 202 and the first end portion 206 is prevented, and the armature 130 is secured to the door control 110. In order to facilitate removal of the armature 130, the horseshoe member 210 may be moved to its decoupling state, for example by a user exerting a pushing force on the projection 218.

FIG. 5 illustrates the coupling mechanism 200 in its decoupling state, to which it may be moved against the force of the biasing mechanism 230 by a user manually exerting a pushing force on the projection 218. In this state, the enlarged-diameter portions 222 are removed from the grooves 203 and the reduced-diameter portions 224 are aligned with the grooves 203. As a result, the pinion 202 and the first end portion 206 are axially decoupled, and the armature 130 is operable to be removed from the door control 110. Thus, the coupling mechanism 200 is one example of a coupling mechanism operable to be manually moved between its coupling state and its decoupling state without requiring the use of a tool.

Figure 6:
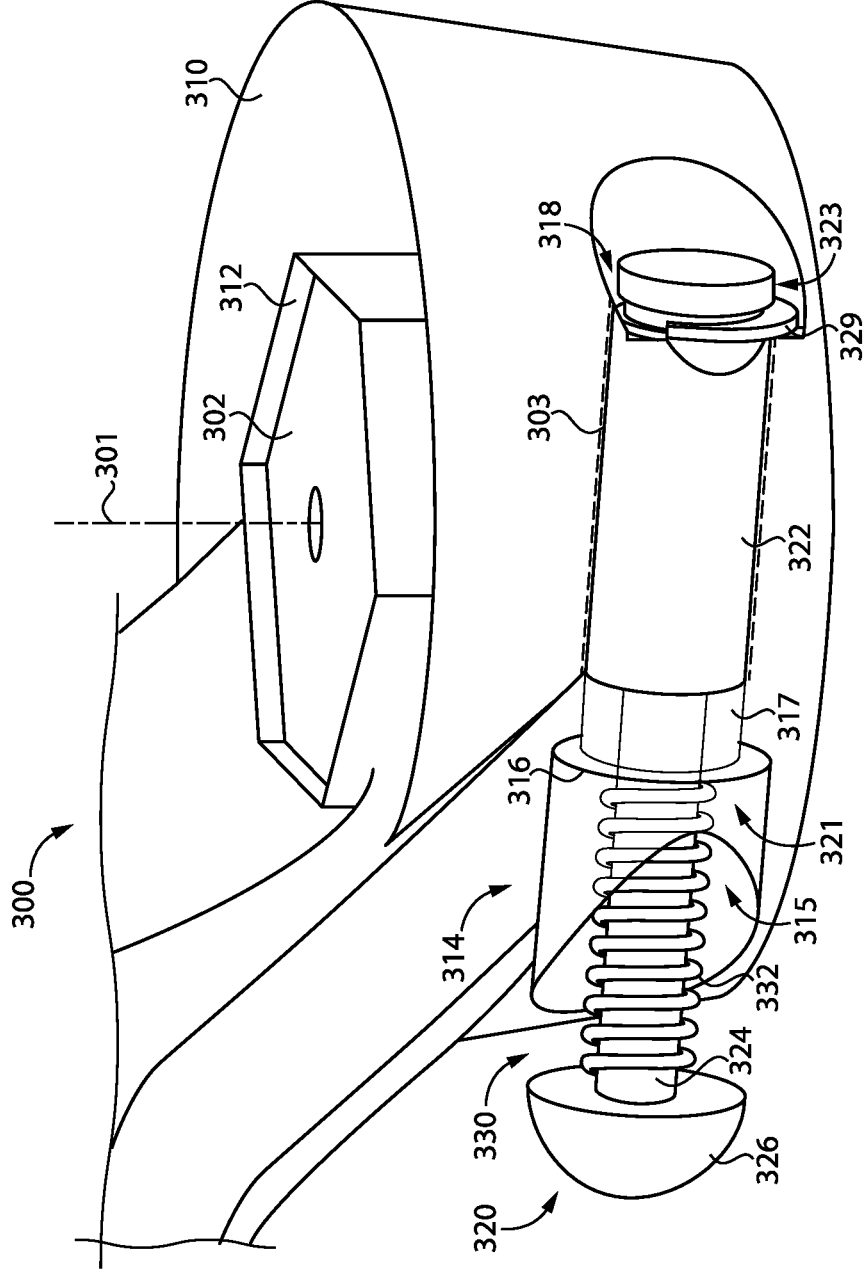
FIG. 6 is a perspective illustration of a coupling mechanism according to certain embodiments.

With additional reference to FIG. 6, illustrated therein is a coupling mechanism 300 according to certain embodiments. The coupling mechanism 300 is an embodiment of the above-described coupling mechanism 102, and is illustrated along with a pinion 302 corresponding to the pinion 114 and an armature first end portion 310 corresponding to the first end portion 131 of the armature 130. The pinion 302 includes a groove 303 that corresponds to the at least one recess 115, and is mounted for rotation about a rotational axis 301. Additionally, the armature first end portion 310 includes an opening 312 corresponding to the opening 135 and a cavity 314 corresponding to the cavity 136. The cavity 314 includes an enlarged portion 315 that terminates at a first shoulder 316 and a reduced-diameter portion 317 extending from the first shoulder 316 to a second shoulder 318.

The coupling mechanism 300 includes a coupler in the form of a pin 320 seated in the cavity 314 and a biasing mechanism 330 urging the pin 320 toward a coupling position. The pin 320 includes an enlarged-diameter portion 322, a reduced-diameter portion 324, and a head 326, which are arranged such that the enlarged-diameter portion 322 and the head 326 are positioned on opposite sides of the reduced-diameter portion 324. In certain forms, the enlarged-diameter portion 322 and the reduced-diameter portion 324 may collectively be referred to as the shaft 321 of the pin 320.

The shaft 321 of the pin 320 extends through the cavity 314 such that a distal end 323 of the enlarged-diameter portion 322 extends beyond the second shoulder 318. A retainer such as a circlip 329 is engaged with the distal end 323 and the second shoulder 318 to restrict longitudinal movement of the pin 320. The head 326 is sized and shaped to be received in the enlarged portion 315, and the biasing mechanism 330 includes a biasing member in the form of a compression spring 332 that is captured between the head 326 and the first shoulder 316 such that the biasing mechanism 330 urges the pin 320 toward its coupling position. It is also contemplated that the biasing mechanism 330 may include other forms of biasing members, such as one or more extension springs, torsion springs, leaf springs, elastic members, and/or magnets.

Operation of the coupling mechanism 300 is substantially similar to the operation of the above-described coupling mechanism 200. As noted above, the biasing mechanism 330 biases the pin 320 toward its coupling position, thereby biasing the coupling mechanism 300 toward its coupling state. In this state, the enlarged-diameter portion 322 of the pin 320 is seated in the groove 303 and axially couples the armature first end portion 310 with the pinion 302. The coupling mechanism 300 can be moved to its decoupling state by exerting on the head 326 a manual force sufficient to overcome the force of the biasing mechanism 330. Such a manually-exerted force moves the pin 320 to its uncoupling position, in which the reduced-diameter portion 324 is aligned with the groove 303 such that the armature first end portion 310 and the pinion 302 are axially decoupled. Thus, the coupling mechanism 300 is another example of a coupling mechanism operable to be manually moved between its coupling state and its decoupling state without requiring the use of a tool.

Figure 7:
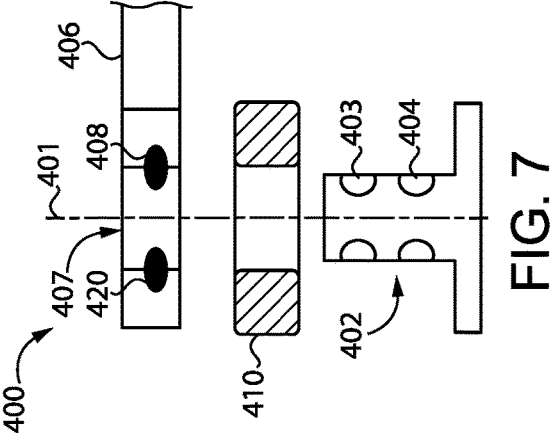
FIG. 7 is a schematic cross-sectional illustration of a coupling mechanism according to certain embodiments in an exploded state.

With additional reference to FIG. 7, illustrated therein is a coupling mechanism 400 according to certain embodiments. The coupling mechanism 400 is an embodiment of the above-described coupling mechanism 102, and is illustrated along with a pinion 402 corresponding to the pinion 114, an armature first end portion 406 corresponding to the first end portion 131 of the armature 130, and a C-shaped spacer 410 operable to be seated on the pinion 402 between the armature first end portion 406 and the body of the door control. The pinion 402 is rotatable about a rotational axis 401, and includes a retaining groove 403 and a removal groove 404. Each of the grooves 403, 404 is substantially annular, and one of the grooves 403, 404 may be deeper than the other of the grooves 403, 404. The first end portion 406 includes an opening 407 corresponding to the opening 135 and an annular groove 408 corresponding to the cavity 136.

The coupling mechanism 400 includes a coupler in the form of a generally annular canted coil spring 420, which is seated in the annular groove 409 such that a radially-inward portion 422 of the canted coil spring 420 projects into the opening 407. The radially-inward portion 422 is operable to be received in each of the grooves 403, 404, each of which is sized and shaped to provide a particular function when engaged with the radially-inward portion 422 of the canted coil spring 420. More particularly, the retaining groove 403 is sized and shaped such that when the radially-inward portion 422 is received therein, movement of the first end portion 406 in a first direction (upward in FIG. 7) is prevented, while movement of the first end portion 406 in an opposite second direction (downward in FIG. 7) is permitted. Conversely, the removal groove 404 is sized and shaped such that when the radially-inward portion 422 is received therein, movement of the first end portion 406 in the second direction is permitted.

Figure 8:
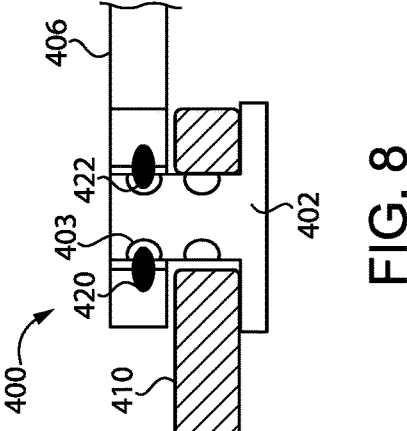
FIG. 8 is a schematic cross-sectional illustration of the coupling mechanism illustrated in FIG. 7 in a coupling state.
Figure 10:
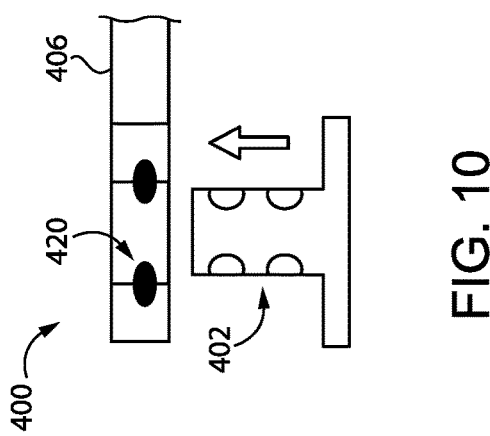
FIG. 10 is a schematic cross-sectional illustration of the coupling mechanism illustrated in FIG. 7 in a decoupled state.
Figure 9:
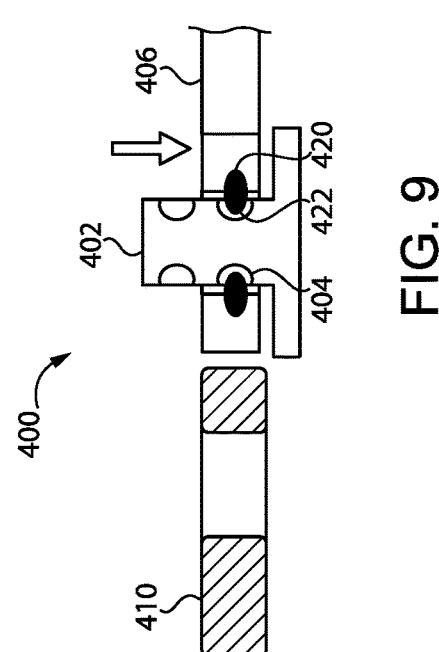
FIG. 9 is a schematic cross-sectional illustration of the coupling mechanism illustrated in FIG. 7 in a decoupling state.

With additional reference to FIGS. 8-10, the coupling mechanism 400 is configured to selectively axially couple the pinion 402 and the armature first end portion 406. During installation, the spacer 410 is seated on the pinion 402 such that the spacer 410 prevents the armature end portion 406 from moving to a position in which the radially-inward portion 422 of the canted coil spring 420 engages the removal groove 404. The pinion 402 is then inserted into the opening 407 such that the radially-inward portion 422 of the canted coil spring 420 enters the retaining groove 403. In this state (FIG. 8), movement of the first end portion 406 in the first direction (upward in FIG. 8) is prevented by the engagement of the canted coil spring 420 with the retaining groove 403, and movement of the first end portion 406 in the second direction (downward in FIG. 8) is prevented by the spacer 410. As a result, the pinion 402 and the first end portion 406 are axially coupled.

To facilitate removal of the first end portion 406 from the pinion 402, the spacer 410 may be removed. With the spacer 410 removed (FIG. 9), the first end portion 406 can be slid in the second direction (downward in FIG. 9) until the canted coil spring 420 engages with the removal groove 404. With the radially-inward portion 422 received in the removal groove 404, movement of the armature end portion 406 in the first direction (upward in FIG. 9) is enabled, and the pinion 402 and end portion 406 are axially decoupled. As a result, the armature end portion 406 can be slid in the first direction to remove the armature end portion 406 from the pinion (FIG. 10). Thus, the coupling mechanism 400 is another example of a coupling mechanism operable to be manually moved between its coupling state and its decoupling state without requiring the use of a tool.

Figure 11:
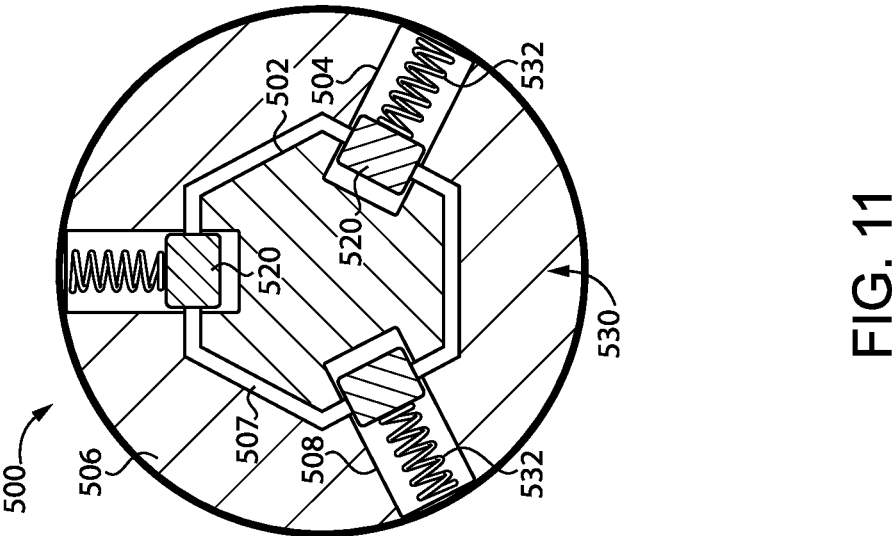
FIG. 11 is a schematic plan view of a coupling mechanism according to certain embodiments in a coupling state.

With additional reference to FIG. 11, illustrated therein is a coupling mechanism 500 according to certain embodiments. The coupling mechanism 500 is an embodiment of the above-described coupling mechanism 102, and is illustrated along with a pinion 502 corresponding to the pinion 114, and an armature first end portion 506 corresponding to the first end portion 131 of the armature 130. The pinion 502 includes one or more recesses 504 corresponding to the at least one recess 115, and the armature end portion 506 includes an opening 507 corresponding to the opening 135 and a plurality of cavities 508 corresponding to the cavity 136.

The coupling mechanism 500 generally includes a plurality of magnetic or magnetizable couplers 520 and a biasing mechanism 530 biasing the coupling mechanism 500 to a coupling state in which the couplers 520 project into the opening 507. The biasing mechanism 530 includes a plurality of biasing members 532, each of which is seated in a corresponding and respective cavity 508 and is engaged with a corresponding and respective coupler 520 to urge the coupler 520 to its radially-inward coupling position. While the illustrated coupling mechanism 500 employs three couplers 520, it is to be appreciated that more or fewer couplers 520 may be utilized in other embodiments. Additionally, while each of the illustrated biasing members 532 is provided in the form of a compression spring, it is also contemplated that one or more of the biasing members 532 may be provided in another form, such as that of an extension spring, a torsion spring, a leaf spring, an elastic members, and/or magnets.

FIG. 11 illustrates the coupling mechanism 500 in its coupling state, in which each coupler 520 is in its radially-inward coupling position and projects into an aligned recess 504 of the pinion 502. As a result, the pinion 502 and the armature end portion 506 are axially coupled with one another.

Figure 12:
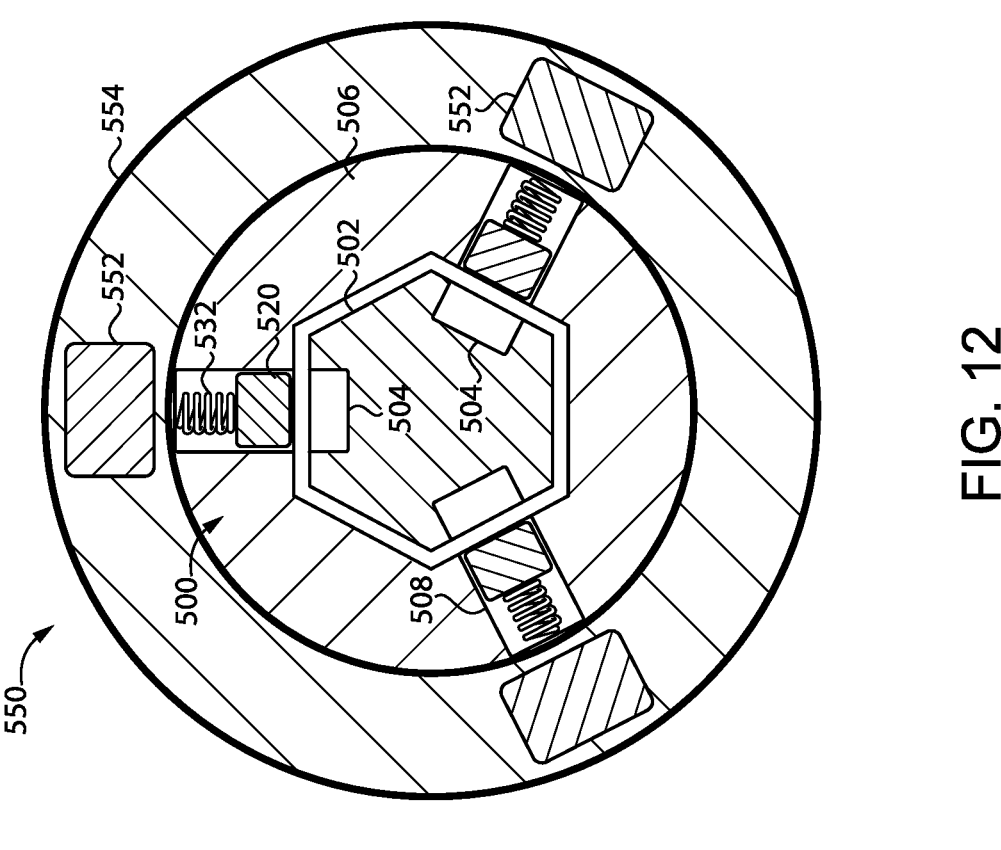
FIG. 12 is a schematic plan view of the coupling mechanism illustrated in FIG. 11 while in a decoupling state.

With additional reference to FIG. 12, the coupling mechanism 500 is configured for use with a removal tool 550 including one or more magnets 552. The magnets 552 are seated in a housing 554 sized and shaped to receive the armature end portion 506. The magnets 552 are of sufficient strength that when the removal tool 550 is placed in its removal position (FIG. 12), the force of the magnets 552 overcomes the force of the biasing members 532 and moves the couplers 520 to their radially-outward decoupling positions. In this state, the couplers 520 are removed from the recesses 504 such that the pinion 502 and the armature end portion 506 are axially decoupled from one another, thereby facilitating removal of the armature from the pinion.

Figures 13, 14, 15:
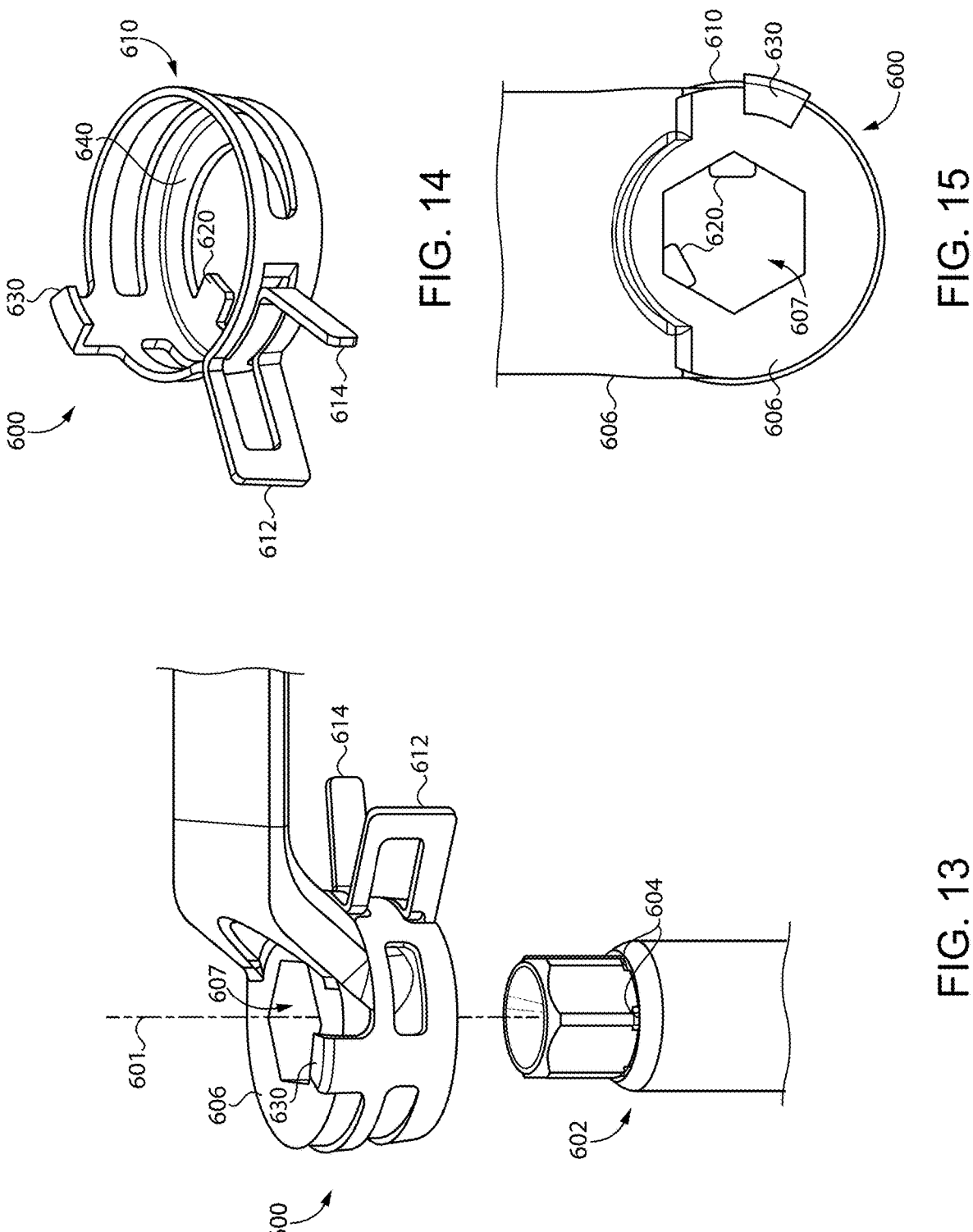
FIG. 13 is a perspective illustration of a coupling mechanism according to certain embodiments.
FIG. 14 is a perspective illustration of the coupling mechanism illustrated in FIG. 13.
FIG. 15 is a plan view of the coupling mechanism illustrated in FIG. 13 in a coupling state.

With additional reference to FIG. 13, illustrated therein is a coupling mechanism 600 according to certain embodiments. The coupling mechanism 600 is an embodiment of the above-described coupling mechanism 102, and is illustrated along with a pinion 602 corresponding to the pinion 114, and an armature first end portion 606 corresponding to the first end portion 131 of the armature 130. The pinion 602 is rotatable about a rotational axis 601, and includes one or more recesses 604 corresponding to the at least one recess 115. Additionally, the armature end portion 606 includes an opening 607 corresponding to the opening 135. In the illustrated form, the pinion 602 and the opening 607 have hexagonal cross-sections, and the recesses 604 are aligned with vertices of the hexagonal cross-section of the pinion 602. It is also contemplated that the pinion 602 may have a different non-circular cross-sectional geometry and/or that the recesses 604 may be provided along the flat faces of the non-circular geometry.

With additional reference to FIGS. 14 and 15, the coupling mechanism 600 is provided as a clamping collar 600. The clamping collar 600 generally includes a collar portion 610 and a coupler in the form of at least one engagement tab 620, and may further include a retention tab 630 opposite the at least one engagement tab 620. In the illustrated form, a rim 640 projects inward from one end of the collar portion 610, and the engagement tab(s) 620 project inward from the rim 640. The collar portion 610 includes a first arm 612 and a second arm 614, which are arranged such that pressing the arms 612, 614 toward one another expands the clamping collar 600 from a coupling state to a decoupling state, thereby moving the engagement tabs 620 between a radially-inward coupling position and a radially-outward decoupling position. The clamping collar 600 is self-biased toward the coupling state and may, for example, be formed of stamped sheet metal.

When the clamping collar 600 is assembled to the armature, the armature end portion 606 is circumferentially surrounded by the collar portion 610 and is captured between the engagement tabs 620 and the retention tab 630, which cooperate to prevent relative axial movement of the clamping collar 600 and the armature end portion 606. In the illustrated embodiment, the retention tab 630 abuts the upper surface of the end portion 606 to facilitate such axial retention. In other forms, the end portion 606 may be provided with a circumferential groove in which the retention tab 630 is seated.

In the self-biased coupling state (FIG. 15), the engagement tabs 620 project into the recesses 604 of the pinion 602 and axially couple the armature end portion 606 with the pinion 602. To facilitate removal of the armature from the pinion 602, the arms 612, 614 may be pressed toward one another to elastically deform the clamping collar 600 to its decoupling state. This deformation causes the engagement tabs 620 to exit the recesses 604, thereby axially decoupling the armature end portion 606 from the pinion 602 and enabling removal of the armature from the pinion 602. Thus, the coupling mechanism 600 is yet another example of a coupling mechanism operable to be manually moved between its coupling state and its decoupling state without requiring the use of a tool.

Figures 16, 17, 18:
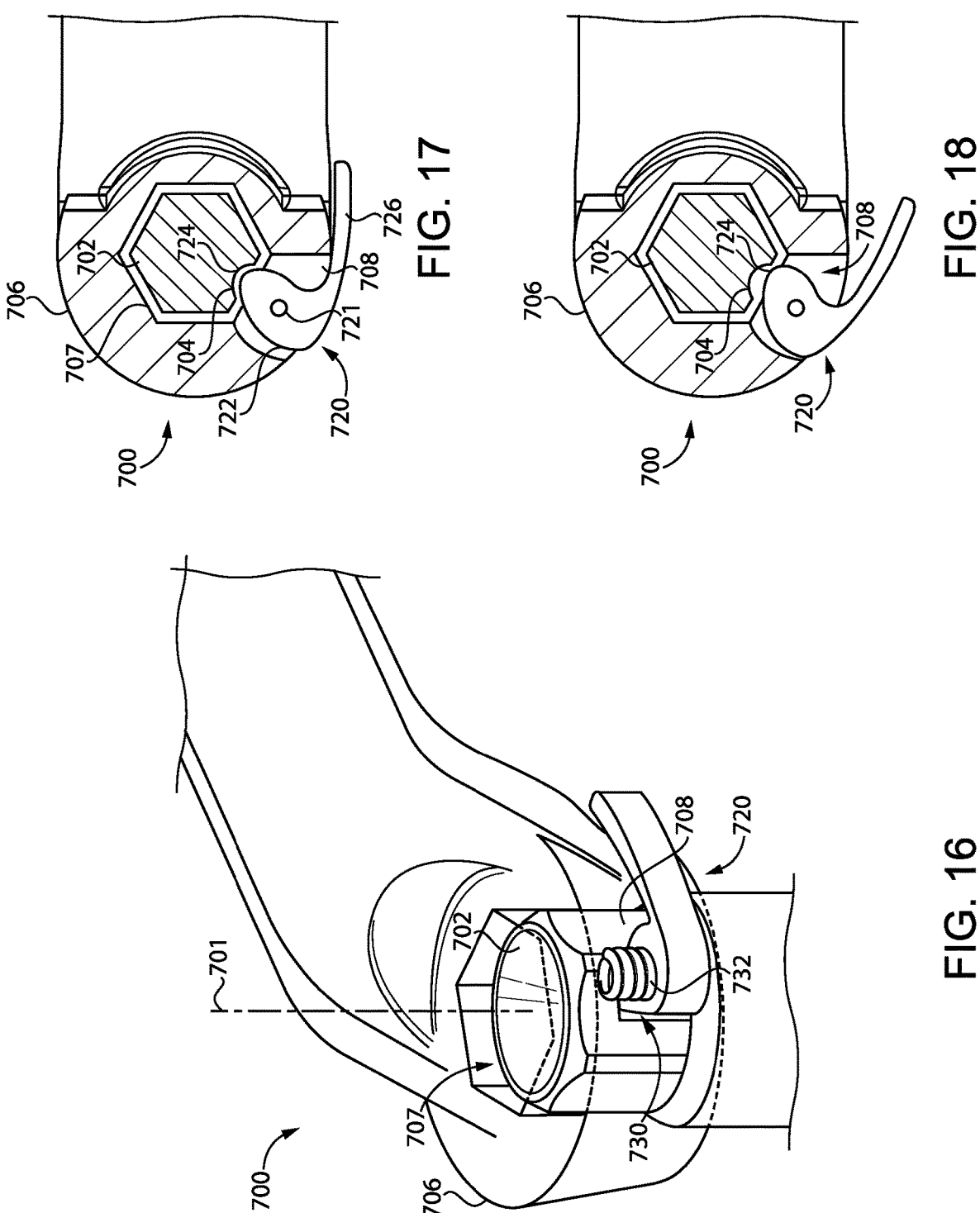
FIG. 16 is a perspective view of a coupling mechanism according to certain embodiments.
FIG. 17 is a cutaway view of the coupling mechanism illustrated in FIG. 16 while in a coupling state.
FIG. 18 is a cutaway view of the coupling mechanism illustrated in FIG. 16 while in a decoupling state.

With additional reference to FIG. 16, illustrated therein is a coupling mechanism 700 according to certain embodiments. The coupling mechanism 700 is an embodiment of the above-described coupling mechanism 102, and is illustrated along with a pinion 702 corresponding to the pinion 114, and an armature first end portion 706 corresponding to the first end portion 131 of the armature 130. The pinion 702 is rotatable about a rotational axis 701, and includes a recess 704 corresponding to the at least one recess 115. Additionally, the armature end portion 706 includes an opening 707 corresponding to the opening 135 and a cavity 708 corresponding to the cavity 136.

With additional reference to FIGS. 17 and 18, the coupling mechanism 700 generally includes a coupler in the form of a camlock arm 720 pivotably mounted in the cavity 708 and a biasing mechanism 730 in the form of a torsion spring 732 biasing the camlock arm 720 toward a coupling position in which the camlock arm 720 extends into the opening 707 (FIG. 17). While the illustrated biasing member is provided in the form of a torsion spring 732, it is also contemplated that other forms of biasing members may be utilized, such as compression springs, extension springs, leaf springs, elastic members, and/or magnets. The camlock arm 720 generally includes a body portion 722 pivotably mounted to the end portion 706 via a pivot pin 721, a lobe 724 extending from one side of the body portion 722, and a lever arm 726 extending from the body portion 722 at an angle relative to the lobe 724. The lever arm 726 facilitates manual manipulation of the camlock arm 720 toward the decoupling state against the force of the biasing mechanism 730.

The camlock arm 720 is biased toward the coupling position (FIG. 17), in which the lobe 724 projects into the recess 704, thereby axially coupling the armature end portion 706 with the pinion 702. In order to facilitate removal of the armature, the camlock arm 720 may be urged against the force of the biasing mechanism 730 to its decoupling position (FIG. 18), in which the lobe 724 is removed from the recess 704. In this state, the pinion 702 and the end portion 706 are axially decoupled from one another, and the armature can be removed from the pinion 702. Thus, the coupling mechanism 700 is yet another example of a coupling mechanism operable to be manually moved between its coupling state and its decoupling state without requiring the use of a tool. In the illustrated form, the lobe 724 projects into the recess 704 when the camlock arm 720 is in its coupling position. It is also contemplated that the recess 704 may be omitted, and that the lobe 724 may engage the outer periphery of the pinion 702 with a frictional fit.

In the embodiments described hereinabove, the illustrative coupling mechanisms are configured to selectively axially couple the armature with to the pinion. Additionally or alternatively, a coupling mechanism may be configured to selectively rotationally couple the armature with the pinion. A coupling mechanism along these lines is illustrated in FIGS. 19-22.

Figure 20:
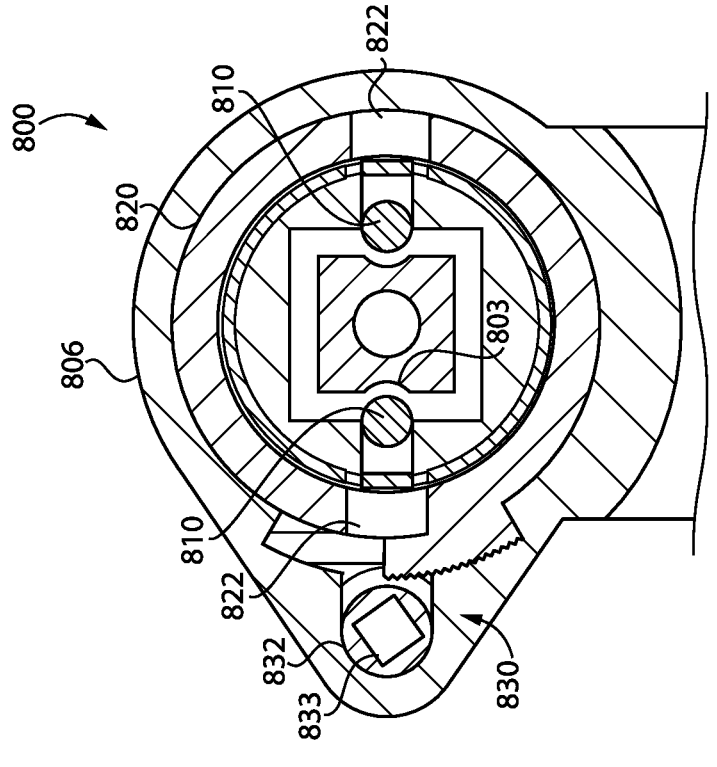
FIG. 20 is a plan view of the coupling mechanism illustrated in FIG. 19 while in a coupling state.
Figure 19:
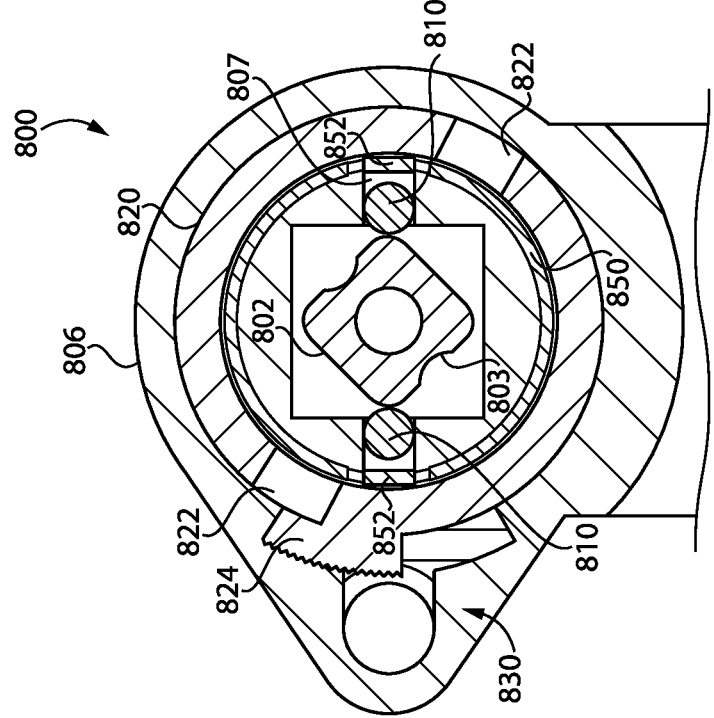
FIG. 19 is a plan view of a coupling mechanism according to certain embodiments while in a decoupling state.

With additional reference to FIGS. 19 and 20, illustrated therein is a coupling mechanism 800 according to certain embodiments. The coupling mechanism 800 is an embodiment of the coupling mechanism 102, and is configured to selectively rotationally couple a pinion 802 with an armature first end portion 806. The coupling mechanism 800 generally includes at least one coupler in the form of a spherical roller 810 movably seated in a cavity 807 of the armature end portion 806, a blocking ring 820 rotatably mounted in the cavity 807, a magnetic lock mechanism 830 operable to rotate the blocking ring 820 between an unblocking position (FIG. 19) and a blocking position (FIG. 20), and a retaining ring 850 configured to restrict radially-outward movement of the rollers 810.

The rollers 810 are seated in the cavity 807 and are engaged with the pinion 802, which in the illustrated embodiment, has a generally square-shaped cross-section and a pair of recesses 803 formed in the radially-outer periphery thereof. As will be appreciated, however, the pinion 802 may have another cross-section, such as a hexagonal cross-section. As described herein, rotation of the pinion 802 urges the rollers 810 radially outward, and the blocking ring 820 selectively prevents such radially-outward movement of the rollers 810 to rotationally and axially couple the armature end portion 806 with the pinion 802. While the illustrated embodiment includes a pair of rollers 810, it is also contemplated that more or fewer rollers 810 may be utilized.

The blocking ring 820 is rotatable between a blocking position and an unblocking position. When in the unblocking position (FIG. 19), blocking portions 822 of the blocking ring are misaligned with the rollers 810 such that each roller 810 is free to move from a radially-inward coupling position to a radially-outward decoupling position as the pinion 802 rotates. As such, the armature end portion 806 is rotationally and axially decoupled from the pinion 802. When in the blocking position (FIG. 20), the blocking portions 822 are aligned with the rollers 810 such that each roller 810 is retained in its radially-inward coupling position. As a result, the armature end portion 806 is rotationally and axially coupled with the pinion 802. The blocking ring 820 also includes a toothed extension 824 by which the blocking ring 820 can be rotated via the magnetic lock mechanism 830.

Figures 21, 22:
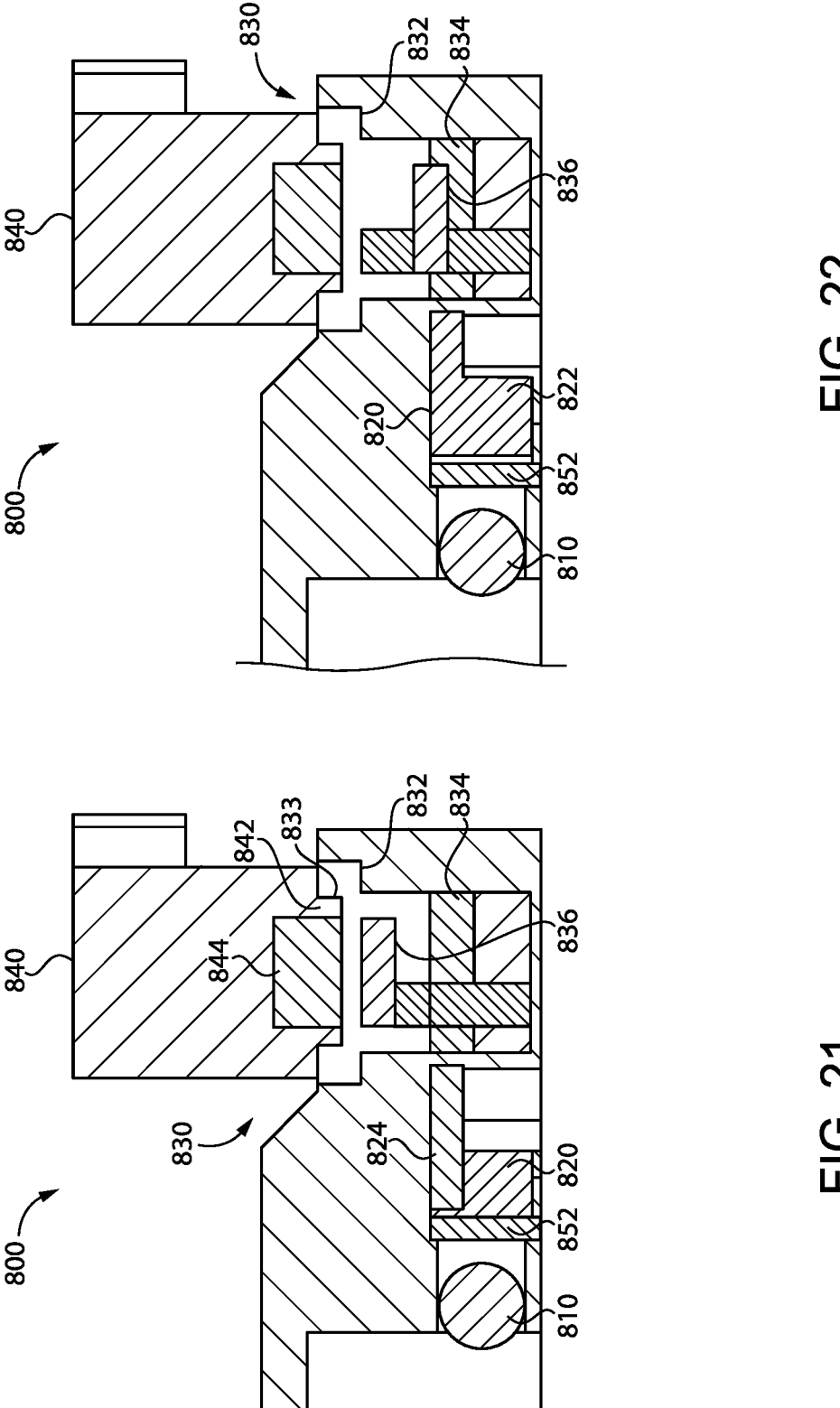
FIG. 21 is a cross-sectional view of the coupling mechanism illustrated in FIG. 19 with a magnetic lock mechanism in a disengaged state.
FIG. 22 is a cross-sectional view of the coupling mechanism illustrated in FIG. 19 with the magnetic lock mechanism in an engaged state.

With additional reference to FIGS. 21 and 22, the magnetic lock mechanism 830 generally includes a rotatable adapter 832, a rotatable gear component 834, and a magnetic coupler 836 selectively coupling the adapter 832 and the gear component 834. The adapter 832 includes an adapter recess 833 sized and shaped to matingly engage a projection 842 of a magnetic key 840 such that the key 840 is operable to rotate the adapter 832 when the projection 842 is seated in the adapter recess 833. The gear component 834 includes teeth that mesh with teeth of the toothed extension 824 such that rotation of the gear component 834 causes a corresponding rotation of the blocking ring 820 between its blocking position and its unblocking position. The magnetic coupler 836 is biased toward a disengaged position (FIG. 21) in which the adapter 832 and the gear component 834 are rotationally decoupled from one another, and is movable to an engaged position (FIG. 22) in which the coupler 836 rotationally couples the adapter 832 and the gear component 834.

The magnetic key 840 includes a projection 842 sized and shaped for mating engagement with the recess 833, and a magnet 844 is mounted in the projection 842. When the projection 842 is matingly engaged with the recess 833, magnetic interaction between the magnet 844 and the magnetic coupler 836 drives the coupler 836 from its disengaged position (FIG. 21) to its engaged position (FIG. 22). As a result, the key 840 is operable to rotate the gear component 834 to drive the blocking ring 820 between its blocking position and its unblocking position.

The retaining ring 850 includes a pair of resilient arms 852 that restrict radially-outward movement of the rollers 810. More particularly, the arms 852 prevent movement of each roller 810 beyond its radially-outward decoupling position. When the blocking ring 820 is in its unblocking position and the rollers 810 are driven toward their radially-outward decoupling positions by rotation of the pinion 802, the arms 852 flex radially outward. When the blocking ring 820 is in its blocking position, however, the blocking portions 822 prevent such radially-outward flexing of the arms 852, thereby retaining the rollers 810 in their radially-inward coupling positions.

In certain embodiments, the pinion 802 may have formed therein recesses 803 operable to receive the rollers 810. In such forms, the coupling mechanism 800 may provide for selective axial coupling of the pinion 802 and the armature end portion 806 in addition to rotational coupling. More particularly, when the blocking ring 820 is in its blocking position, the rollers 810 are seated in the recesses 803, and provide for both rotational and axial coupling of the pinion 802 and the armature end portion 806.

As should be evident from the foregoing, the subject application generally relates to coupling mechanisms operable to selectively axially and/or rotationally couple the pinion 114 of a door control 110 with the end portion 131 of an armature 130. In addition to providing for selective axial and/or rotational coupling, the coupling mechanisms described herein may aid in preventing the use of an armature 130 with a door control 110 in which the pinion is not specifically configured for use with the coupling mechanism. In certain embodiments, for example, the pinion 114 must include a recess 115 sized and shaped to receive the coupler 140 in order for the pinion 114 to be axially coupled with the armature 130. In such embodiments, the lack of such a recess 115 will preclude axial coupling of the pinion 114 with the armature first end portion 131; the armature 130 therefore will not be able to be used with door controls manufactured by other manufacturers. This can be particularly advantageous when the armature assembly 130 includes proprietary features and it is desired to prevent such proprietary features from being used in combination with a door control manufactured by a competitor.

Additionally, the embodiments described hereinabove may facilitate the installation process. More particularly, each of the embodiments described obviates the need to turn a screw about the rotational axis of the pinion, which can be particularly troublesome in cases where the pinion is in close proximity to the ceiling. Certain embodiments eliminate the need for installation tools altogether, thereby further facilitating the installation process.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A door control assembly, comprising:

a door control, comprising:

a body; and a pinion rotatably mounted to the body for rotation about a longitudinal rotational axis, the pinion having a radially-outer periphery and a recess formed in the radially-outer periphery; and an armature assembly, comprising:

an armature rotationally coupled with the pinion, the armature including a first end portion defining an opening in which the pinion is received; and a clamping collar including a rim, an engagement tab, a retention tab longitudinally offset from the rim, and a collar portion including a pair of arms operable to elastically deform the clamping collar to thereby move the engagement tab between a coupling position and a decoupling position, wherein the rim projects inward from an end of the collar portion, and wherein the engagement tab projects radially inward from the rim;

wherein the first end portion of the armature is captured longitudinally between the rim and the retention tab to thereby prevent longitudinal movement of the clamping collar relative to the armature;

wherein, with the engagement tab in the coupling position, the engagement tab projects into the recess and axially couples the armature and the pinion to prevent removal of the armature from the pinion; and wherein, with the engagement tab in the decoupling position, the engagement tab disengages from the pinion to permit removal of the armature from the pinion.

2. The door control assembly of claim 1, wherein the engagement tab is biased toward the coupling position by the clamping collar.

3. The door control assembly of claim 1, wherein the radially outer periphery of the pinion has a polygonal cross-section; and wherein the recess is positioned at a vertex of the polygonal cross-section.

4. The door control assembly of claim 1, wherein each of the radially-outer periphery and the opening comprises a corresponding plurality of flat surfaces.

5. The door control assembly of claim 1, wherein at least a portion of the first end portion is sandwiched between the rim and the retention tab.

6. The door control assembly of claim 1, wherein the retention tab abuts a first longitudinal side of the first end portion; and wherein the rim abuts an opposite second longitudinal side of the first end portion.

7. An armature assembly configured for use with a door control comprising a pinion having an outer cross-section, the armature assembly comprising:

an armature including a first end portion and an opposite second end portion;

an opening defined in the first end portion of the armature and extending along a longitudinal rotational axis, the opening having an inner cross-section corresponding to the outer cross-section such that the opening is operable to receive the pinion to rotationally couple the armature with the pinion; and a clamping collar mounted to the first end portion of the armature, the clamping collar comprising:

an engagement tab having a coupling position and a decoupling position;

a retention tab longitudinally offset from the engagement tab;

a collar portion surrounding the first end portion of the armature, wherein the engagement tab extends radially inward from the collar portion;

a pair of arms operable to expand the collar to thereby move the engagement tab from the coupling position to the decoupling position; and a rim extending inward from one end of the collar portion, wherein the engagement tab extends inward relative to the rim;

wherein the first end portion is longitudinally captured between the retention tab and the rim to thereby prevent removal of the clamping collar from armature;

wherein with the engagement tab in the coupling position, the engagement tab projects inward beyond a periphery of the opening and is operable to axially couple the armature with the pinion; and wherein with the engagement tab in the decoupling position, the engagement tab is inoperable to axially couple the armature with the pinion.

8. The armature assembly of claim 7, wherein the collar portion biases the engagement tab toward the coupling position.

9. The armature assembly of claim 7, wherein the arms are configured to move the clamping collar from a coupling state to a decoupling state when the arms are pressed toward one another.

10. The armature assembly of claim 7, wherein the clamping collar is formed of stamped sheet metal.

11. A door control assembly comprising the armature assembly of claim 7, and further comprising the door control; and wherein the armature is selectively axially coupled with the pinion by the engagement tab.

12. The door control assembly of claim 11, wherein the pinion comprises a plurality of recesses operable to receive the engagement tab.

13. The door control assembly of claim 12, wherein the outer cross-section of the pinion has a polygonal shape; and wherein the recesses are positioned at vertices of the polygonal shape.

* * * * *